INVENTORS.
GUSTAVE SHAPIRO
MAX I. ROTHMAN
BY
ATTORNEY

INVENTORS.
GUSTAVE SHAPIRO
MAX I. ROTHMAN
BY William D. Hall
Attorney.

Aug. 9, 1949.                M. I. ROTHMAN ET AL                    2,478,208
                              WAVE MEASURING SYSTEM
Filed March 26, 1945                                              4 Sheets-Sheet 4

FIG. 8.

INVENTORS.
GUSTAVE SHAPIRO
MAX I. ROTHMAN
BY *William D. Hall.*
ATTORNEY

Patented Aug. 9, 1949

2,478,208

UNITED STATES PATENT OFFICE 2,478,208

WAVE MEASURING SYSTEM

Max I. Rothman, Hollis, N. Y., and Gustave Shapiro, Asbury Park, N. J., assignors to the United States of America as represented by the Secretary of War Application March 26, 1945, Serial No. 585,002

5 Claims. (Cl. 343—12)

(Granted under the act of March 3, 1883, as amended April 30, 1928; 370 O. G. 757)

The invention described herein may be manufactured and used by or for the Government for governmental purposes, without the payment to us of any royalty thereon.

Our present invention relates to a method of and means for measuring distances by the use of continuously radiated electromagnetic waves and more especially, but not exclusively, to the determination of range between separately disposed radio communication field stations.

The present invention may be employed advantageously in conjunction with the radio ranging method and apparatus disclosed and claimed in the co-pending patent application of Shapiro entitled "Measuring system," Serial No. 596,715, filed May 30, 1945.

It is known that if an electromagnetic wave is radiated at one point reflected or reradiated at a second point and finally received at the first point, by comparing the phase of the radiated wave with the received wave which has been displaced in phase relative to the transmitted wave as a function of the distance between points, range between the first and second point may be determined on this basis.

This is the underlying principle of the radio ranging system described in the referenced application wherein the range is measured between two communication stations having transmitting, receiving, and phase comparison means. At the first station a low frequency sine-wave modulation signal is impressed upon a radio carrier transmitted in a channel A. At the second station the channel A carrier is received and demodulated and the modulation component thus gained is impressed as a modulation signal upon the second station transmitter emitting a radio carrier in a channel B. Finally, the channel B carrier is received and demodulated at the first station and the modulation component thus gained is compared in phase with the initial form of the modulation signal. Since the original modulation signal as emitted at the first station has been displaced in phase as a function of the distance to and from the second station, range between stations may be calculated.

The range measurements are taken at either the first or second stations depending on where the modulation signal is originated. In the referenced application the station originating the modulation signal and where the ranging measurements are taken is designated as the "superior" station whereas the station retransmitting the modulation signal is identified as the "inferior" station. This nomenclature will be retained in the present specification. The modulation component yielded in the output of the superior receiver will hereinafter be identified as the "echo" modulation signal; whereas the modulation signal applied to the carrier of the superior transmitter will hereinafter be referred to as the "original" modulation signal.

The referenced application has for one of its main objects the compensation of all variable phase shifts arising in either the transmitting or receiving equipment of the superior c. inferior station. By variable phase shifts is meant all shifts imparted to the modulation signals, exclusive of the shift resulting as a function of the distance between stations, which occur because of temperature changes, de-tuning of the receiver from the carrier frequency, and several other factors. These variable shifts, when integrated with the phase shift existing as a function of the distance between stations, create spurious range indications. The method employed in the referenced application compensating for these variable shifts will be utilized in a similar manner in apparatus disclosed in the present application.

It is an object of the present invention to provide new and improved measuring means in a radio ranging system for determining the range between a superior and inferior station.

Another object of this invention is to provide a method of aligning to the same frequency the modulation signal generators of the superior and inferior stations in a radio ranging system thereby obviating the need for highly accurate generators.

In attaining the objects of the present invention a measuring device for a radio ranging system is provided wherein the original sinusoidal modulation waves and the echo sinusoidal waves are converted into sharp pulse trains. The displacement between pulse trains, when determined, affords the index to the range. The measuring device comprises a visual indicator tube in co-operation with a coincidence circuit having a pair of input channels. Each cycle of the original modulation signal is converted into a sharp pulse and fed into one of the input channels, and similarly each cycle of the echo modulation signal is converted into a sharp pulse and fed into the other input channel. The coincidence circuit is so arranged in association with the visual indicator that unless the pulses in the respective channels correspond in time, irrespective of their amplitudes, the indicator does not respond. Inasmuch as the echo signal pulses are displaced from the original modulation signal pulses as a function of the distance between stations, the indicator normally does not respond. By providing a calibrated pulse delay network to shift one train of pulses in respect to the other until coincidence is attained thereby actuating the visual indicator, the time delay between pulses may be directly interpreted in terms of range.

The visual indicator also serves to align to the same frequency the modulation generators of the respective stations. This is achieved by applying current derived from the respective generators to the indicator.

The indicator is designed to flicker at a rate in accordance with the frequency of the applied energy. Because of the phenomenon of visual persistence the indicator flicker will not be apparent to the eye of the observer since the ranging frequency will at least be in excess of 100 cycles per second. However, a small disparity between the applied frequencies will result in a very low frequency beat causing the indicator to flicker at a perceptible rate. Thereupon one of the generators is adjusted in a direction reducing the rate of flicker until a point is reached where the flicker entirely disappears and the two generators are perfectly aligned.

For a better understanding of this invention, together with other and further features and objects thereof, reference is had to the ensuing description, taken in connection with the accompanying drawings, wherein like parts are indicated by like reference numerals. The scope of this invention will be pointed out in the accompanying claims.

In the appended drawings.

Figure 1:
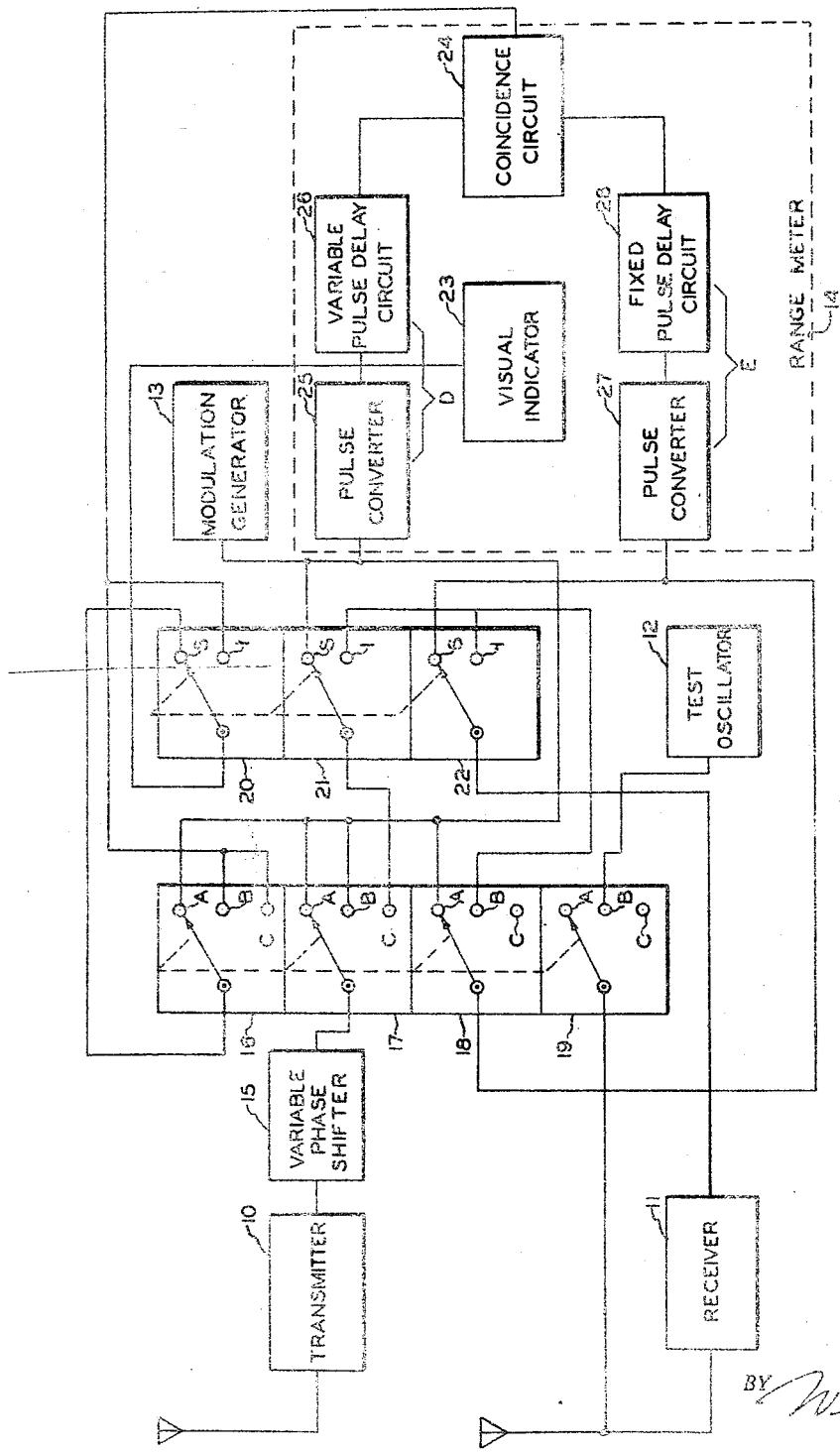
Figure 1 is a block diagram of the invention in a preferred embodiment thereof showing a complete radio ranging station, capable of operation either as a superior or inferior station, and, Figure 2 is a block diagram of the connections between station elements for a first test procedure in inferior operation.

Referring now to the drawing and more particularly to Figure 1, a ranging station is shown in block diagram form, designed for either superior or inferior operation. For purposes of simplicity the station to be described will be of the amplitude-modulation type, although the invention is applicable with equal effectiveness to communication stations employing other modulation systems, as for example, frequency-modulation.

The station comprises the following major elements: A radio frequency transmitter 10, a radio receiver 11, a test oscillator 12, a low-frequency modulation generator 13, a range meter 14, and a variable phase shifter 15. Multi-position switches 16, 17, 18, 19, 20, 21 and 22 are provided for the function of selectively associating the station elements in arrangements enabling the performance of various testing procedures necessary prior to operations and for superior or inferior ranging operation. The arms of switches 16—19 are mechanically ganged as are the arms of switches 20—22.

The transmitter 10 is of any conventional design comprising the usual master oscillator, buffer, and power amplifier stages. The carrier frequency may be any suitable channel in the radio spectrum. Also incorporated in the circuit of transmitter 10 is a modulator stage in any form capable of a high percentage of amplitude modulation. The receiver 11 is also of conventional design being of the superheterodyne or any other type enabling good sensitivity and selectivity. The resonant frequency of receiver 11 is made sufficiently distinct from the carrier frequency of transmitter 10 so that it is not responsive thereto.

In practice, a station identical in all respects with that illustrated in Fig. 1 performs as a superior or inferior station in cooperation therewith. The respective carriers of the superior and inferior transmitters are set in different channels whereas the superior receiver is tuned to the frequency of the inferior carrier and the inferior receiver is resonant to the superior carrier.

The low-frequency modulation generator 13 is of any conventional construction capable of undistorted sine-wave oscillation at any point within a frequency band of a width sufficient to embrace the range requirements of the system, viz., the maximum modulation frequency allowable is that whose period is equal to the time necessary for the transmitted wave to travel from the superior to the inferior station and return.

The test oscillator 12, preferably one of high stability, such as a crystal-controlled oscillator, has an operating frequency equal to the difference between the carrier frequency of transmitter 10 and the resonance frequency of receiver 11. Consequently, when the output of oscillator 12 is heterodyned with the carrier of transmitter 10, one of the resultant beat frequencies is equal to the resonant frequency of receiver 11.

The variable phase shifter 15 may be any conventional network having an adjustable element enabling a 360° displacement in the phase of an alternating current having the frequency of modulation generator 13.

The range meter 14 is provided for the purpose of measuring the time delay between the original and echo modulation signals and it comprises a visual indicator tube 23 preferably of the electron-ray type in cooperation with a coincidence circuit 24 having a pair of input channels D and E. In channel D the original sinusoidal modulation signal is converted into sharp pulses by a pulse converter 25 which furnishes a single pulse for each complete cycle of sine wave. The converter 25 is of any suitable design and may, for example, comprise a limiter circuit for forming the sine wave into a square wave, a differentiating circuit for shaping the square wave into alternate positive and negative pulses and a half-wave rectifier for removing either the negative or positive going pulses so that but a single pulse is produced for each sine cycle. The output of the converter 25 is impressed upon a calibrated variable pulse delay circuit 26 such as an artificial transmission line of adjustable length capable of retarding the position of the pulse train. In channel E the sinusoidal echo modulation signal is converted into pulses by a pulse converter 27 identical in design and operation with converter 25. The pulse output of converter 27 is retarded by a fixed pulse delay network 28 in order to compensate in channel E for the minimum delay introduced in channel D by variable delay circuit 26. The coincidence circuit 24 is so biased that only when the pulses from both input channels arrive simultaneously will the circuit fully actuate indicator 23.

The operation of the station will now be explained in performance as an inferior unit. In general, when the station functions as an inferior unit, the modulated carrier transmitted by the superior station is intercepted by the inferior receiver and the modulation component developed in the output thereof is impressed upon the inferior transmitter as a modulation signal. However, since it is necessary first to eliminate the effects of phase shifts in the modulation signal introduced by the inferior apparatus in order to obtain accurate ranging, two test procedures are essential prior to ranging operation.

Figure 2:
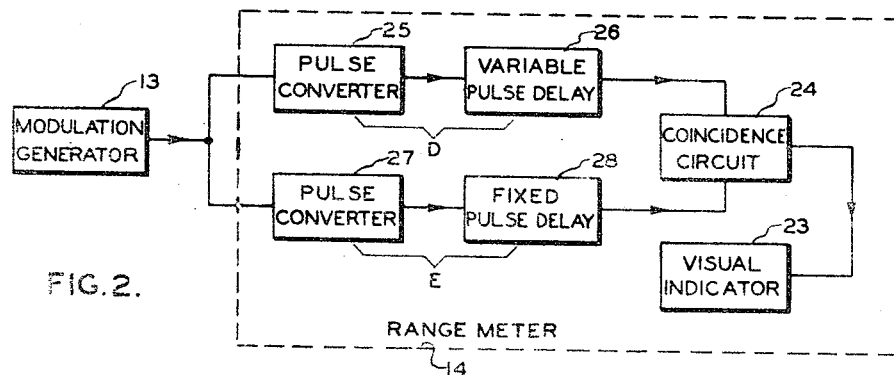

The first test procedure is for the purpose of zero setting the range meter 14. The arrangement of station elements for this purpose is accomplished by setting the arms of switches 20 to 22 on contacts I and the arms of switches 16 to 19 on contacts A. Examination of the circuit will show that in this arrangement modulation generator 13 is connected to the input of channel E of range meter 14 through switch 18, contact A, and the visual indicator 23 is connected to the output of the coincidence circuit 24 through switch 20, contact I. The modulation generator 13 is directly connected to the D channel of range meter 14, and the meter is free from any connection with the other elements of the station. Therefore, this test arrangement may be best viewed and discussed in connection with Figure 2 of the drawing showing the arrangement for zero setting range meter 14 with the switches and unrelated elements of the station removed from the circuit.

Figure 3:
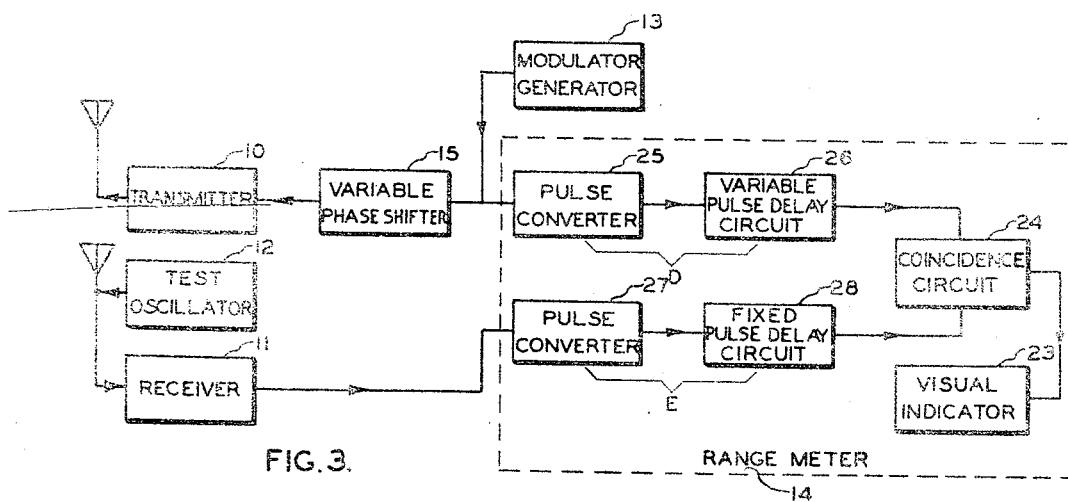
Figure 3 is a block diagram of the connections between station elements for a second test procedure in inferior operation.

It will be seen that modulation generator 13 is fed both into channel D and E; thus at the zero setting the range meter 14 should indicate coincidence. Since the variable delay network 26, at its minimum setting, will introduce some delay, the fixed delay circuit 28 is included in channel E for delaying pulses generated therein to an extent compensating for the minimum delay caused by delay circuit 26. In this procedure variable delay circuit 26 is adjusted to a point where coincidence is obtained between the pulses in channel D and the pulses in channel E as indicated by the operation of indicator 23, this point serving as the zero setting of the range meter 14. After zero setting the range meter 14 the next test procedure, when operating the station as an inferior unit, is to correct for the variable phase shifts arising in the station apparatus. The arrangement of station elements for this purpose is brought about by setting switches 20 to 22 on contacts I and switches 16 to 19 on contacts B. In this arrangement the modulation generator 13 is fed to phase shifter 15 through switch 17, contact B, the output of receiver 11 is applied to the input of channel E of range meter 14 through switch 22 contact I, in series with switch 18 contact B, and the visual indicator 23 is connected to the output of coincidence circuit 24 through switch 20 contact I. The output of test oscillator 12 is combined with the output of transmitter 10 and impressed upon the input of receiver 11 through switch 19, contact B. This working arrangement may be best viewed and understood by referring to Figure 3 wherein the switches and unused elements of the station are deleted and the active station elements are shown in direct connection.

It will be seen that the output of modulation generator 13 is applied into channel D of range meter 14 and also serves to modulate the transmitter 10 through phase shifter 15. The modulated carrier of transmitter 10 is mixed with the output of test oscillator 12 whose frequency is such that one of the resultant beat frequencies is equal to the resonance frequency of receiver 11. Thus, the output of receiver 11 furnishes the modulation component which is thereupon applied to channel E of the range meter 14. Assuming ideal conditions, with phase shifter 15 set at zero phase displacement, the range meter 14 will indicate in the absence of any phase shift introduced by transmitter 10 and receiver 11, coincidence between the output of generator 13 and the output of receiver 11. However, because of various factors previously mentioned, variable phase shifts are introduced in this system which must be compensated for in order to achieve desirable operating conditions. By varying phase shifter 15 to a point where coincidence is attained, the variable shift will be cancelled, the indicator 23 being actuated. The shift introduced by phase shifter 15 is equal in magnitude but in a direction opposed to the shift developed by the station apparatus.

Figure 4:
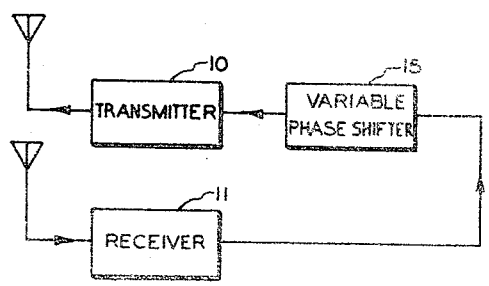
Figure 4 is a block diagram of the connections between station elements in inferior ranging operation.

The testing procedures having been completed, the unit is now available for inferior operation and the switches 20 to 22 are set on contacts I while switches 16 to 19 are set on contacts C. In this arrangement the output of receiver 11 is connected directly to the input of phase shifter 15 through switches 22 contact I, 21 contact I, and 17 contact C, while the range meter 14 and test oscillator 12 are disassociated from the other elements of the station. This arrangement may be viewed in Figure 4 wherein the active elements are shown in direct connection, the switches and inactive elements being eliminated. The carrier from the superior transmitter is detected by receiver 11 and the original modulation component yielded in the output thereof is applied to the transmitter 10 as a modulation signal through phase shifter 15 which corrects for variable shifts introduced by transmitter 10 and receiver 11. When the station operates as an inferior unit, the range meter 14 is utilized solely for the test procedure required to eliminate the effects of variable phase shifts, and is not employed for ranging measurement, this being performed at the superior station.

Figure 5:
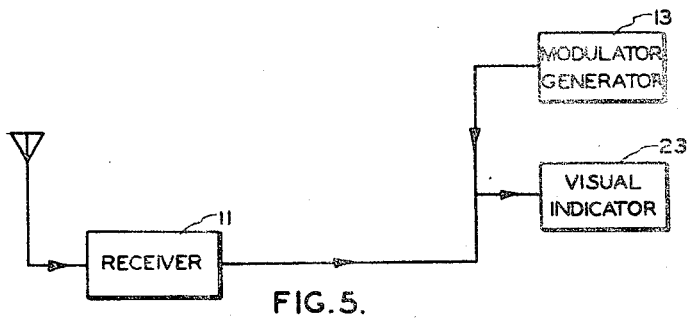
Figure 5 is a block diagram of the connection between station elements in a first test procedure for superior operation.

In the foregoing discussion relative to the station operating as an inferior unit, it has been assumed that the modulation generator 13 is set to precisely the same frequency as the modulation generator of the superior station. In practice, however, a small difference between said generators might exit which would upset the accuracy of the system unless corrected. Accordingly, prior to operating the system for ranging purposes it is first necessary to align the generators of the superior and inferior stations to the same frequency. This is accomplished at the superior station in a first test procedure by setting the arms of switches 20 to 22 on contacts S and switches 16 to 19 on contacts A. In this arrangement the output of receiver 11 is applied to the visual indicator 23 through the serially-connected switches 22 contact S, 18 contact A, 16 contact A, and 20 contact S, while generator 13 is applied to the visual indicator through switches 16 contact A and 20 contact S. This arrangement may be more conveniently understood by referring to Figure 5 of the drawing showing the active elements of the station.

During this procedure, at the inferior station the transmitter is modulated by the modulation generator, all other elements of the station being inactive. This simple arrangement is not illustrated herein. The output of receiver 11 at the superior station, therefore, is the modulation component derived from a carrier of the inferior station, the modulation component being impressed upon the input of the visual indicator 23. Accordingly both inferior and superior modulation frequencies are present in the circuit of indicator 23. If a small difference exists between these frequencies, a difference beat will be set up whose rate will be perceptible to the eye of the observer. Thereupon the operator at either station adjusts the modulation generator 13 in a direction causing the flicker to reduce in rate and finally disappear when the frequencies correspond.

Figure 6:
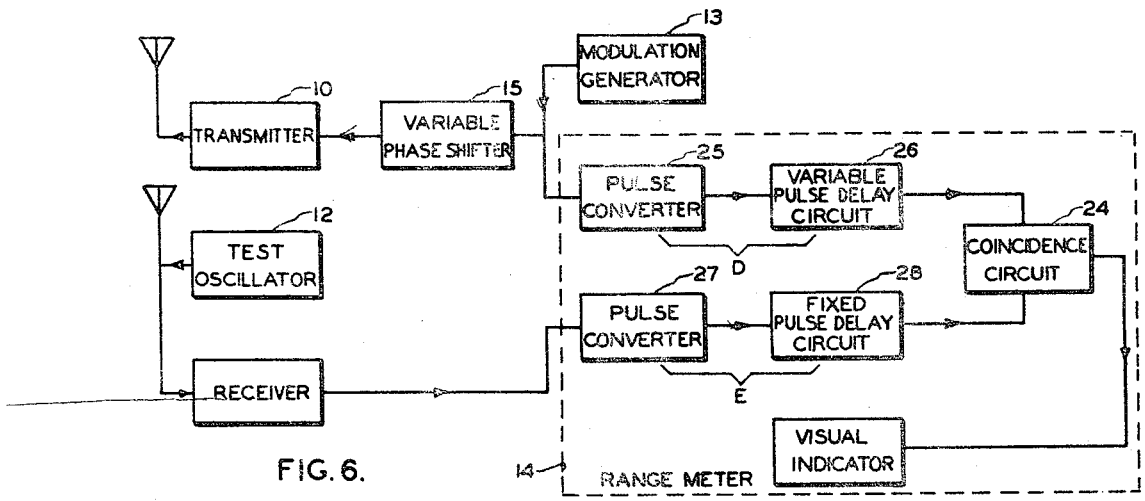
Figure 6 is a block diagram of the connection between station elements in a second test procedure for superior operation.

The operation of the station will now be considered in its functions as a superior unit. The test procedure required prior to operation is for the purpose of cancelling out variable phase shifts imparted to the modulation signal by the station apparatus. In compensating for the shifts the range meter 14 is included in the circuit since in actual ranging operation, as a superior station, the meter forms part of the operating arrangement. In this procedure switches 20 to 22 are shifted to contacts S while switches 16 to 19 are set on contacts B. The modulation generator 13 is applied to the input of phase shifter 15 through switch 17 contact B. The output of receiver 11 is fed to channel E of range meter 14 through switch 22 contact S and the test oscillator 12 is connected to the input of receiver 11 through switch 19 contact B. The arrangement of station elements in this procedure may be best viewed and considered in connection with Figure 6 showing the working station elements in this arrangement. It will be seen that the transmitter 10 is modulated by generator 13 while at the same time the output of modulator 13 is associated with channel D of range meter 14. Test oscillator 12 is heterodyned with transmitter 10, and one of the resultant beats is demodulated in receiver 11. The modulation component derived from the output of receiver 11 is applied to channel E of range meter 14. It is not necessary in this procedure to separately zero set range meter 14 since this operation may be combined with the correction for variable phase shifts in the station apparatus. Variable phase shifter 15 is adjusted to a point where coincidence is obtained between channel D and channel E of the range meter 14 as shown by visual indicator 23. At this point the output of modulation generator 13 is in phase with the output of receiver 11 and the meter 14 is at zero setting irrespective of the position of variable pulse delay circuit 26.

Figure 7:
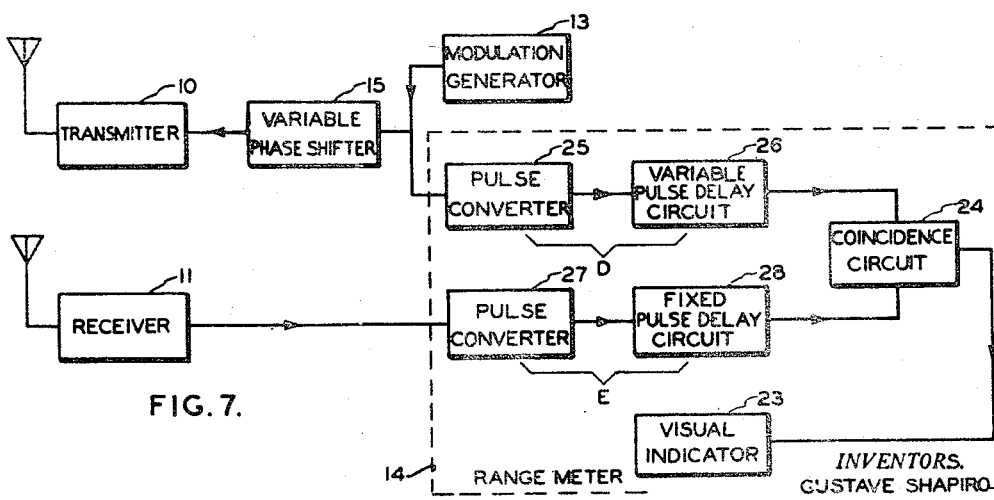
Figure 7 is a block diagram showing connection between station elements in superior ranging operation, and, Figure 8 is a schematic circuit diagram of a preferred embodiment of a range meter employed in conjunction with the present invention.

The unit is now prepared for superior ranging operation. The arms of switches 20 to 22 are positioned on contacts S, and switches 16 to 19 are positioned on contacts C. The ranging generator 13 is applied to the transmitter 10 through switches 21 contact S and 17 contact C; the output of receiver 11 is applied to the fixed sine wave delay 27 through switch 22 contact S. This arrangement may be viewed in Figure 7 showing the active elements only. It will be seen that the range meter compares the echo modulation signal in channel E with the original modulation signal in channel D. Since the echo signal has been retarded in time as a function of the distance to and from the inferior station, the range between stations may be determined by adjusting variable pulse delay circuit 26 until both pulse trains are coincident in circuit 24, thereby operating indicator 23. The velocity of radio waves being known, the range between stations may be readily ascertained as a function of the time delay between pulses.

Referring now to Figure 8, a schematic circuit diagram is shown of another preferred embodiment of a range meter for a radio ranging station. In a broad sense the meter functions in accordance with the same principles governing the operation of range meter 14 in Figure 1. The meter comprises a visual indicator circuit employing an electron-ray tube 29 in association with a coincidence circuit utilizing a duo-triode tube 30. Triode section A of tube 30 is connected to the original modulation signal channel while triode B is connected to the echo modulation signal channel.

The original channel comprises a pulse converter circuit including a pair of duo-triodes 31 and 32 feeding into a variable pulse shifter circuit including duo-triode 33 and pentode 34. The echo channel consists of a pulse converter circuit having a pair of duo-triodes 35 and 36, and a pulse inverter employing a triode 37. For calibrating the range meter, a time-marker generator is provided utilizing a duo-triode 38.

The original sinusoidal modulation signal 39 is applied to terminals 40 of the range meter where it is imposed upon the grid of triode 31 through a phase shifting network composed of capacitor 41 and resistor 42, the combination serving to advance the phase of the original modulating voltage 39 to a fairly small degree. The purpose of this phase shift is to compensate for the minimum time delay introduced by the variable pulse shifter.

Tube 31A operates as a limiter levelling off the positive and negative peaks of the sine wave modulation signal 39 so that the output voltage assumes a trapezoidal shape as shown by form 43. This clipping action is accentuated by grid limiting resistor 44 which develops a voltage drop negative in respect to the grid when grid current is drawn during the positive portion of the grid voltage cycle. Through capacitor 45, the trapezoidal wave 43 is impressed upon the grid of tube 31B which acts as an amplifier, steepening the sides of the trapezoidal wave so that it assumes substantially a rectangular shape as shown by form 46. The rectangular wave 46 is converted into alternate positive and negative pulses as shown by form 47 through a differentiating network consisting of capacitor 48 and resistor 49. Thereupon the pulses are applied to the grid of tube 32A which is biased to the point of cut-off by cathode resistor 50 shunted by condenser 51 so that the tube 32A is responsive only to positive pulses. Because of the IR drop in resistor 52 in the plate circuit of tube 32A, when positive pulses are applied to the grid, the voltage at the plate is in the form of negative going pulses 53 which are applied to the grid of tube 32B through coupling capacitor 54. The negative pulses on the grid of tube 32B effect a decrease in plate current and a corresponding rise in plate voltage due to the IR drop across plate resistor 55.

Hence the time-voltage curve in the plate of tube 32B assumes the shape of positive pulses as shown by form 56. Thus it will be seen that each complete cycle of the original modulation signal 39 in passing through tubes 31 and 32 has been converted into a single positive going pulse.

The variable pulse shifter takes the form of an unbalanced trigger circuit generating a single rectangular wave for each triggering pulse. The rectangular wave yielded by the trigger circuit is differentiated and the pulse corresponding in position with the training edge of the wave is utilized in the coincidence circuit. It is evident that the position of this pulse depends upon the width of the rectangular wave furnished by the triggering circuit. Consequently, by adjusting said width the pulse is correspondingly shifted in position.

The trigger circuit has a single stable condition of equilibrium during which pentode 34 is highly conductive and triodes 33A and B are disabled. The cathodes of tubes 33A and B and 34 are each tied together and connected to ground through resistor 57 shunted by condenser 58. A voltage is applied to the grid of pentode 34 through resistor 59 which renders the tube highly conductive. Since resistor 57 is in series with the plate-cathode circuit of pentode 34, when the pentode is conductive, the resultant IR drop in resistor 57 impresses a cut-off bias on tubes 33A and B. The condition of equilibrium is upset when a positive triggering pulse from the plate circuit of tube 33B is applied to the grid of tube 33A through coupling capacitor 60. The positive pulse overcomes the negative bias on tube 33A causing a plate current to flow through variable plate resistors 61, 62, and 63. This effects a drop in potential on the plates of tubes 33A and B which in turn impresses a negative voltage on the grid of pentode 34 through coupling capacitor 64 causing a decrease in plate current therein. The reduction of plate current through pentode 34 raises the voltage on the plate thereof, thereby causing a positive bias to be imposed on the grid of tube 33B through capacitor 65, while, at the same time reducing the bias on tube 33B applied by resistor 57. This results in a flow of plate current in tube 33B, which in turn imposes a negative bias on the grid of pentode 34 through capacitor 64, further diminishing the flow of plate current therein. This degeneration continues at a rapid rate until pentode 34 is completely cut-off. Pentode 34 remains nonconductive for a period determined by the time constant of the circuit elements, which constant may be varied by adjusting resistors 61, 62, and 63. The values of resistors 61, 62, and 63 are such as to permit degrees of coarse and fine adjustment. Tube 34, after a predetermined time interval, again becomes conductive and the trigger circuit reverts to its condition of equilibrium until again set off by the next triggering pulse. Since pentode 34 alternates between a conductive and nonconductive condition its output is in the form of a rectangular wave 66 which is taken off at the screen grid of the tube and differentiated by a network consisting of condensers 67 and resistor 68. The alternate positive and negative pulses thus obtained as shown by form 69 are applied to the grid of coincidence tube 30A.

The sinusoidal echo modulation signal 70 is applied to terminals 71 which feed the signal to the grid circuit of triode 35A. Triode 35A operates as a limiter employing a grid limiting resistor 72 in a manner identical with tube 31A. The output of the limiter is a trapezodial wave 73 which is impressed upon the grid circuit of triode 35B through coupling capacitor 74. Triode 35B behaves as an amplifier steepening the sides of a trapezoid so that the output assumes the form of a rectangular wave 75. Rectangular wave 75 is differentiated into alternate positive and negative pulses as shown by form 82 by a network composed of capacitor 76 and resistor 77. The pulses are then applied to the grid of triode 36A which is biased to cut-off by cathode resistor 78 shunted by capacitor 79 so that only the incoming positive pulses effect a change in plate current. The positive pulses produce surges of plate current in tube 36A causing a voltage drop across resistor 80 and a consequent reduction in plate voltage so that the output assumes the form of negative pulses as shown in form 81. Through coupling capacitor 83, the pulses are applied to triode 36B operating as an amplifier. Since the pulses are negative in polarity the resultant reduction in plate current causes a rise in plate voltage so that the output of tube 36B takes the form of positive pulses as shown by form 84. The positive pulses are inverted in polarity by applying them to the grid of triode 37 through capacitor 85. Since the positive pulse on the grid of tube 37 causes surges of plate current and a consequent drop in plate voltage, the output takes the form of negative pulses as shown by form 86. The output of the echo channel is made available at contact 87 of switch 90, said contact being connected to the plate of tube 37 through a coupling capacitor 104. Thus it will be seen that each cycle of the echo sine wave in passing through tubes 35, 36, and 37 has been converted into a single negative going pulse.

Coincidence tubes 30A and B have their plates and cathodes, each tied together. The voltage on the plates of tubes 30A and B is adjusted by variable resistor 92 to a point where maximum plate current is made to flow. Hence only a negative pulse applied to the grid of tube 30A and B will effect a change in the plate current since positive pulses can effect no increased current flow. The plates of coincidence tubes 30A and B are connected to the grid of visual indicator tube 29 through capacitor 93. When a negative pulse appears on the grid of either 30A or B the resultant reduction in plate current and rise of plate voltage causes a positive voltage pulse to be applied to the grid of visual indicator 29. In the absence of voltage on the grid of indicator 29 the tube is initially adjusted to display a maximum reading. When a positive surge from the coincidence tube 30 is applied to the grid of indicator 29, grid current is drawn through resistor 91 thereby applying a negative voltage to the grid and reducing the indicator reading to an extent depending on the voltage applied to the grid. The circuit is arranged so that only when both grids of tubes 30A and B receive negative pulses simultaneously, will the indicator reading be brought to zero reading. If, while a negative pulse appears on the grid of either tube 30A or B, the other grid is free of voltage, the indicator display will be at the midpoint.

In calibrating the range meter, marking pulses having a relatively high repetition rate in respect to the pulses obtained from the modulation signals are applied to the grid of coincidence tube 30B while pulses from the output of the original channel are applied to the grid of coincidence tube 30A. For purposes of illustration it will be assumed that the marker pulse repetition rate is 200,000 per second and the modulation pulse is 1,000 per second. Only when there is coincidence between an original pulse and a marker pulse will the indicator tube 29 display a zero reading. If the train of original pulses is shifted in respect to the train of marking pulses, coincidence will be indicated every five microseconds. In the calibration procedure, the pulse shifter is adjusted from minimum delay to maximum delay and the points of coincidence are noted on the adjusting dial. The marking pulses are furnished by a pulse generator comprising a damped wave oscillator employing triode 38B and a pulse forming circuit employing triode 38A. The repetition rate of the marking pulses is determined by the frequency of the parallel resonant circuit formed by inductor 94 and capacitor 95, the combination being connected in series with the plate of tube 38B and the voltage supply thereof. A positive pulse from the output of tube 32B is applied to the grid of tube 38B through capacitor 96 and the resultant grid current flow through grid resistor 97 applies a negative voltage which cuts off the plate current flow, thereby causing the resonant circuit to break into oscillation. The oscillatory wave decays in accordance with the circuit characteristics so that it takes a shape as shown by form 98. Through condenser 99 this damped wave is fed to the grid of tube 38A which is so biased by resistor 100 as to be responsive only to the upper positive portion of the damped wave. Consequently the output of tube 38A is a group of sharp negative pulses as shown by form 101, which pulses are of successively smaller amplitude. These pulses are made available by connecting the plate of triode 38A through condenser 102 to contact 103 of switch 90. In calibrating the range meter the arm of switch 90 is positioned on contact 103, thereby applying the marking pulses to the grid of triode 30B.

In zero setting the meter, in-phase sinusoidal modulation voltages are applied both to the original and echo channel inputs. The phase shifter in the original channel is adjusted until coincidence is obtained between the pulse outputs of the channels, this position being the zero setting of the meter.

While there have been described what are at present considered preferred embodiments of the invention, it will be obvious to those skilled in the art that various changes and modifications may be made therein without departing from the invention, and it is, therefore, aimed in the appended claims, to cover all such changes and modifications as fall within the true spirit and scope of the invention.

We claim:

1. In combination with a radio ranging system wherein the distance between two points is determined by means of a sinusoidal modulation signal transmitted from the first point to the second point and return, a range meter comprising means for converting each cycle of original modulation signal into a pulse, means for converting each cycle of echo modulation signal into a pulse displaced in time in respect to said original pulse in proportion to the phase displacement between said original and echo modulation signals, and means for measuring the displacement between said original and echo pulses, said last named means being calibrated continuously in terms of range.

2. In combination with a radio ranging system wherein the distance between two points is determined by means of a sinusoidal modulation signal transmitted from the first point to the second point and return, a range meter comprising means for converting each cycle of original modulation signal into a pulse, means for converting each cycle of echo modulation signal into a pulse displaced in time in respect to said original pulse in proportion to the phase displacement between said original and echo modulation signals, a dual input coincidence circuit, one input receiving said original pulses and the other input receiving said echo pulses, an indicator associated with the output of said coincidence circuit in a manner whereby it is responsive only when the original and echo pulses are coincident, and means for shifting the original pulses in respect to the echo pulses to an extent effecting coincidence therebetween, said last named means being calibrated continuously in terms of range.

3. In combination with a radio ranging system wherein the distance between two points is determined by means of a sinusoidal modulation signal transmitted from the first point to the second point and return, a range meter comprising means for converting each cycle of original modulation signal into a pulse, means for converting each cycle of echo modulation signal into a pulse displaced in time in respect to said original pulse in proportion to the phase displacement between said original and echo modulation signals, a dual input coincidence circuit, one input receiving said original pulses and the other input receiving said echo pulses, an indicator associated with the output of said coincidence circuit in a manner whereby it is responsive only when the original and echo pulses are coincident, a trigger circuit interposed in one of said coincidence input circuits for generating a rectangular wave in response to a triggering pulse, means for varying the width of said rectangular wave, and means for producing a pulse corresponding with the trailing edge of said rectangular wave thereby effectively shifting the position of the pulse applied to said coincidence input circuit.

4. In combination with a radio ranging system wherein the distance between two stations is determined by means of a low frequency modulation signal transmitted from the first station to the second station at which point it is retransmitted to the first station, a range meter at the first station comprising means for converting each cycle of the original modulation signal into a pulse, means for converting each cycle of the echo modulation signal into a pulse displaced in time with respect to the original pulse in proportion to the phase displacement between said original and echo modulation signals, means triggered by each of said original pulses for generating a train of marker pulses, said marker pulses having a repetition rate which is a predetermined multiple of said original pulses, a dual input coincidence circuit, means for applying said original pulses to one input of said coincidence circuit, selective means for applying either said marker pulses or said echo pulses to the other input of said coincidence circuit, an indicator coupled to the output of said coincidence circuit whereby it is responsive only at the time position at which said original pulses and said echo pulses or said marker pulses are coincident, and means for shifting the time position of said original pulses with respect to said echo pulses or said marker pulses to an extent effecting coincidence therebetween, said marker pulses serving to calibrate said last named means in terms of range, the extent of said shift effecting coincidence between said original pulses and said echo pulses providing a range reading.

5. The combination, as defined in claim 4, wherein said means for generating a train of said marker pulses includes an electron discharge device having at least cathode, control grid and plate electrodes, a parallel resonant circuit, a source of direct-current potential, means for applying said potential source to said plate in series with said resonant circuit whereby said device is normally conductive, means for applying said original pulses to said control grid to render said device nonconductive, thereby causing said resonant circuit to break into damped oscillations, and means for rectifying said damped oscillations to produce a train of uni-polarity marker pulses.

MAX I. ROTHMAN.
GUSTAVE SHAPIRO.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,050,418 | Boerner | Aug. 11, 1936 |
| 2,134,716 | Gunn | Nov. 1, 1938 |
| 2,147,810 | Alford | Feb. 21, 1939 |
| 2,198,113 | Holmes | Apr. 23, 1940 |
| 2,282,951 | Engelhardt | May 12, 1942 |
| 2,320,476 | Schrader et al. | June 1, 1943 |
| 2,407,294 | Shockley | Sept. 10, 1946 |
| 2,416,895 | Bartelink | Mar. 4, 1947 |